(12) United States Patent
Petiton et al.

(10) Patent No.: US 9,744,793 B2
(45) Date of Patent: Aug. 29, 2017

(54) OPTICAL SAFETY COMPONENT HAVING A TRANSMISSIVE EFFECT, MANUFACTURE OF SUCH A COMPONENT, AND SECURE DOCUMENT PROVIDED WITH SUCH A COMPONENT

(75) Inventors: Valéry Petiton, Vendrest (FR); Jean Sauvage-Vincent, Saint Maur des Fossés (FR); Alexandre Noizet, Bussy Saint Georges (FR); Yves Jourlin, Saint Etienne (FR)

(73) Assignees: Hologram Industries, Bussy Saint Georges (FR); Universite Jean Monnet, Saint-Etienne (FR)

( * ) Notice: Subject to any disclaimer, the term of this patent is extended or adjusted under 35 U.S.C. 154(b) by 966 days.

(21) Appl. No.: 14/110,509

(22) PCT Filed: Apr. 5, 2012

(86) PCT No.: PCT/EP2012/056301
§ 371 (c)(1),
(2), (4) Date: Oct. 8, 2013

(87) PCT Pub. No.: WO2012/136777
PCT Pub. Date: Oct. 11, 2012

(65) Prior Publication Data
US 2014/0028012 A1    Jan. 30, 2014

(30) Foreign Application Priority Data

Apr. 8, 2011  (FR) ...................................... 11 53068

(51) Int. Cl.
*B42D 25/00* (2014.01)
*B42D 25/328* (2014.01)
(Continued)

(52) U.S. Cl.
CPC ........... *B42D 25/373* (2014.10); *B42D 25/00* (2014.10); *B42D 25/29* (2014.10); *B42D 25/328* (2014.10);
(Continued)

(58) Field of Classification Search
CPC .............................. B42D 25/328; G02B 5/008
(Continued)

(56) References Cited

U.S. PATENT DOCUMENTS 6,428,051 B1    8/2002  Herrmann et al.
6,600,603 B1 *  7/2003  Sambles ................ G02B 5/008
                                                                283/91

(Continued)

FOREIGN PATENT DOCUMENTS

EP         1801546 A1   6/2007
EP       2 228 671 A1   9/2010
(Continued)

OTHER PUBLICATIONS

"Spatially and polarization resolved plasmon mediated transmission through continuous metal films" Jourlin et al., Optics Express 17, 14 (2009) 12155-12166 (12 pages).

(Continued)

*Primary Examiner* — Kyle Grabowski
(74) *Attorney, Agent, or Firm* — Osha Liang LLP

(57) ABSTRACT

According to one aspect, the invention relates to an optical safety component having a plasmonic effect intended to be observed by transmission, including two layers (101, 103) made of a transparent dielectric material, a metal layer (102) that is arranged between said layers made of dielectric material to form two dielectric-metal interfaces (105, 106), and is structured to form on at least a portion thereof corrugations (104) that are capable of coupling surface plasmon modes supported by said dielectric-metal interfaces (Continued)

with an incident light wave. The corrugations are arranged in a first coupling area in a first main direction and in at least one second coupling area separate from said first coupling area, in a second main direction that is substantially perpendicular to said first main direction, said metal layer being continuous on each one of said coupling areas.

20 Claims, 11 Drawing Sheets

(51) Int. Cl.
    *B42D 25/373* (2014.01)
    *G02B 5/00* (2006.01)
    *G02B 5/18* (2006.01)
    *G07D 7/12* (2016.01)
    *G07D 7/00* (2016.01)
    *B42D 25/29* (2014.01)

(52) U.S. Cl.
    CPC ........... *G02B 5/008* (2013.01); *G02B 5/1809* (2013.01); *G07D 7/0006* (2013.01); *G07D 7/124* (2013.01); *B42D 2035/24* (2013.01); *B42D 2035/36* (2013.01)

(58) Field of Classification Search
    USPC .................................................. 359/567, 574
    See application file for complete search history.

(56) References Cited

U.S. PATENT DOCUMENTS

| | | | |
|---|---|---|---|
| 2005/0128590 A1 | 6/2005 | Schilling et al. | |
| 2007/0147221 A1* | 6/2007 | Parriaux | G01D 5/38 |
| | | | 369/275.4 |
| 2007/0200940 A1 | 8/2007 | Gruhlke et al. | |
| 2009/0190223 A1 | 7/2009 | Petiton et al. | |
| 2010/0307705 A1* | 12/2010 | Rahm | B42D 25/29 |
| | | | 428/156 |

FOREIGN PATENT DOCUMENTS

| | | |
|---|---|---|
| EP | 2 228 672 A1 | 9/2010 |
| WO | 01/44839 A1 | 6/2001 |
| WO | 03/059643 A1 | 7/2003 |
| WO | 2008/031170 A1 | 3/2008 |
| WO | 2010/063737 A1 | 6/2010 |

OTHER PUBLICATIONS

European Office Action (Notice of Opposition) in corresponding EP application No. for EP 2695006, filed on Jul. 13, 2016 and English translation thereof (23 pages).
International Search Report issued in PCT/EP2012/056301 mailed on Jul. 3, 2012 (6 pages).
Written Opinion of the International Searching Authority issued in PCT/EP2012/056301 mailed on Jul. 3, 2012 (6 pages).
International Preliminary Report on Patentability from PCT/EP2012/056301 issued on Jul. 1, 2013 (6 pages).
PCT Chapter II Demand from PCT/EP2012/056301 mailed on Feb. 7, 2013 (9 pages).
Irving, T.; "Butterfly Wings Inspire Anti-Counterfeit Devices"; Canadian Chemical News, XP002662455, Mar. 2011, (1 pages).
Najiminaini, M. et al.; "Optical transmission analysis of nano-hole arrays as a function of angle of incident light"; OSA/BIOMED/DH 2010; Apr. 11, 2010, pp. 1-3 (3 pages).

* cited by examiner

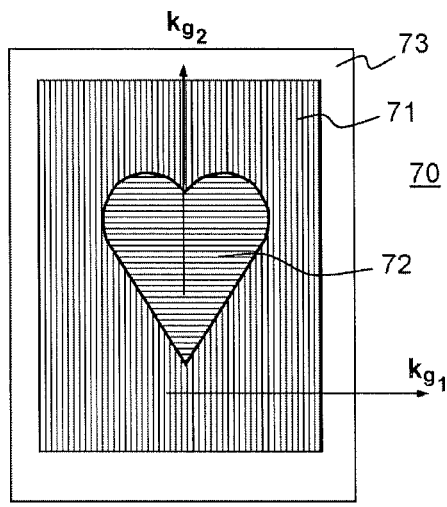
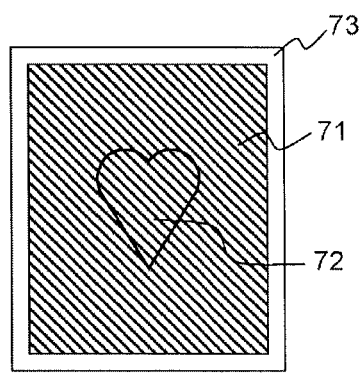
FIG.7A    FIG.7B
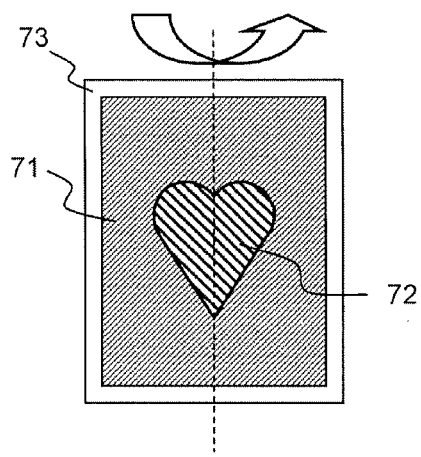
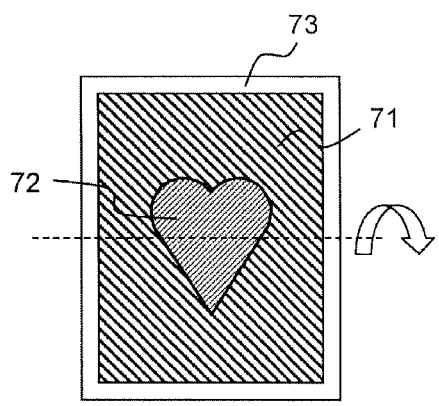
FIG.7C    FIG.7D

US 9,744,793 B2

OPTICAL SAFETY COMPONENT HAVING A TRANSMISSIVE EFFECT, MANUFACTURE OF SUCH A COMPONENT, AND SECURE DOCUMENT PROVIDED WITH SUCH A COMPONENT

FIELD OF THE INVENTION

The present invention relates to the field of security markings. More particularly, it relates to a transmissive optical security component for verifying the authenticity of a document, to a method for manufacturing such a component and to a secure document equipped with such a component.

PRIOR ART

Many technologies for authenticating documents or products, and especially for securing documents, such as documents of value, i.e. banknotes, passports, or identification documents, etc., are known. These technologies aim to produce optical security components the optical effects of which take very characteristic and verifiable configurations depending on the parameters of the observation (orientation relative to the axis of observation, position and dimensions of the light source, etc.). The general aim of these optical components is to produce novel and differentiated effects from physical configurations that are difficult to reproduce.

Among these components, DOVIDs (for diffractive optically variable image devices) are optical components, commonly called holograms, which produce variable diffractive images. These components are generally observed in reflection.

The present patent application relates to optical security components that can be checked in transmission.

Among these components, U.S. Pat. No. 6,428,051 describes a document of value, of the banknote type, comprising an aperture forming a window covered by a security film, the security film being fixed by an adhesive to the perimeter of the window formed in the document, and comprising a certain number of authenticating features.

In the article by I. Aubrecht et al. ("Polarization-sensitive multilayer diffractive structures for document security", Proceedings of SPIE Vol. 7358, 2009) a multilayer structure is described exhibiting resonant transmission effects based on the excitation of plasmonic modes at the interfaces between a structured metal layer and two dielectric layers encapsulating the metal layer. This article reports the polarization dependence of the effect and proposes a system for checking the authenticity of a component produced in this way based on analysis of the polarization of the transmitted wave.

Patent application US 2010/0307705 describes, in a general way, a security document with a region comprising nanoscale metal patterns for exciting bulk or surface plasmons and generating resonant effects.

The structures described in the aforementioned documents, although they exhibit remarkable effects in transmission or reflection, are not however easy to authenticate with the naked eye, especially as regards authentication in transmission by an inexperienced user.

The present invention provides a plasmonic optical security component that can be very easily and very securely checked in transmission with the naked eye, in order to provide an uninitiated user with a maximum of comfort while guaranteeing authentication with a very high reliability.

SUMMARY OF THE INVENTION

According to a first aspect, the invention relates to a plasmonic optical security component intended to be observed in transmission, said optical component comprising two transparent dielectric layers, and a metal layer arranged between said dielectric layers in order to form two dielectric/metal interfaces, at least one part of the area of the metal layer being structured to form corrugations that are able to couple surface plasmon modes supported by said dielectric/metal interfaces with an incident light wave. The corrugations are arranged in a first main direction in a first coupling zone, and in a second main direction, substantially perpendicular to the first main direction, in at least one second coupling zone separate from the first coupling zone, said metal layer being continuous in each of said coupling zones.

Such a component exhibits an extraordinary transmission effect in a spectral band centered on what is called a central wavelength, defined by the characteristics of the corrugations of the coupling zones, and for an observer, variations in color of the coupling zones with the angle of observation of the component, enabling easy and reliable authentication of the security component.

More precisely, at least two of said coupling zones contain corrugations arranged in two substantially perpendicular main directions, the component exhibiting, when observed in transmission, a marked visual contrast between a first zone, the color of which is stable with the angle of observation of the component, and a second highly variable zone.

As a variant, these coupling zones form complementary patterns, making authentication by an observer even easier, the patterns allowing the movements that will allow a large variation in color to be generated to be made more intuitive for the observer.

As another variant, at least one part of the corrugations are arranged concentrically or radially, in such a way as to make the component axially symmetric. The observation is then independent of azimuth.

As another variant, the metal layer furthermore comprises an unstructured zone. This zone of high optical density makes it possible to further accentuate the coupling zones, which exhibit, in a given spectral band, an extraordinary transmission due to the plasmonic effect.

Advantageously, the corrugations in the coupling zones have a pitch between 100 nm and 600 nm and a depth between 10% and 30% of the pitch. The pitch of the various coupling zones may be identical in order to exhibit similar colors when observed by an observer, or in contrast different colors depending on the desired visual effect.

Advantageously, the difference between the refractive indices of said transparent dielectrics, in the targeted spectral band, preferably the visible, forming each of said layers is less than 0.1, enabling an optimal extraordinary transmission effect at said central wavelength.

As a variant, at least one part of the metal layer is formed of silver and its thickness is substantially comprised between 20 and 60 nm.

As another variant, at least one part of the metal layer is formed of aluminum and its thickness is substantially comprised between 10 and 30 nm.

In one embodiment, the metal layer may be formed of a single metal. The layer then has a substantially constant thickness.

According to another embodiment, the metal layer comprises at least two parts each of which is formed of a different metal. This may enable different visual effects to be obtained, both in reflection and in transmission, in the spectral band of the plasmonic effect.

According to a second aspect, the invention relates to an optical security element intended to secure a document and comprising at least one optical security component according to the first aspect. The security element may comprise other security components, for example holographic components.

As a variant, the security element comprises, depending on the circumstances, other layers required for the final application; for example, the security element may comprise, in addition to the active layers generating the plasmonic effect, a supporting film bearing one of said dielectric layers and/or an adhesive film placed on one of said transparent dielectric layers. These films are neutral with respect to the plasmonic effect because they neither degrade nor affect the dielectric/metal interface. They make it easier to bond the element to a document to be secured and/or to apply it industrially.

According to a third aspect, the invention relates to a secure document comprising a support and an optical security element according to the second aspect, the optical security element being fixed to said support, said support comprising a transparent zone on which said plasmonic optical security component is arranged.

The secure document, for example a document of value, such as a banknote, or an authentication document, such as an identity card, may, by virtue of the plasmonic optical security component according to the invention, be easily checked in transmission, and has a high resistance to counterfeiting due to the technology employed.

As a variant, the optical security component according to the first aspect or the optical security element according to the second aspect is encapsulated in the support of the secure document. Transparent zones are provided on either side of the optical security component, thus enabling it to be checked in transmission.

According to a fourth aspect, the invention relates to a method for manufacturing a plasmonic optical security component, comprising:
  depositing a metal layer on a first transparent dielectric layer; and
  encapsulating said metal layer with a second dielectric layer, in order to form two dielectric/metal interfaces, at least one part of the area of the metal layer being structured to form corrugations that are able to couple surface plasmon modes supported by said dielectric/metal interfaces with an incident light wave, the corrugations being arranged in a first main direction in a first coupling zone, and in a second main direction, substantially perpendicular to said first main direction, in at least one second coupling zone separate from the first coupling zone, said metal layer being continuous in each of said coupling zones.

As a variant, said first dielectric layer is structured to form said corrugations, and the metal layer is deposited, with a substantially constant thickness, on said thus structured first layer.

As another variant, the deposition of the metal layer comprises depositing a first layer comprising a first metal on a first part of the surface of said first dielectric layer and depositing at least one second layer comprising a second metal on a second part of the surface of said first dielectric layer.

As a variant, the deposition of the metal layer is carried out selectively, allowing macroscopic patterns that are visible to the naked eye in transparency to be defined. These patterns correspond to demetallized zones, which will thus be transparent in the visible, these zones possibly being used to increase the resistance of the component to counterfeiting and optionally to increase how easily the person in charge of checking can read the graphic by framing, for example, one of the colored zones.

BRIEF DESCRIPTION OF THE FIGURES

Other features and advantages of the invention will become apparent on reading the following description, which is illustrated by the figures in which:

FIGS. 7A to 7D, schematics illustrating, in various configurations, an example security component according to the invention;

DETAILED DESCRIPTION

Figure 1A:
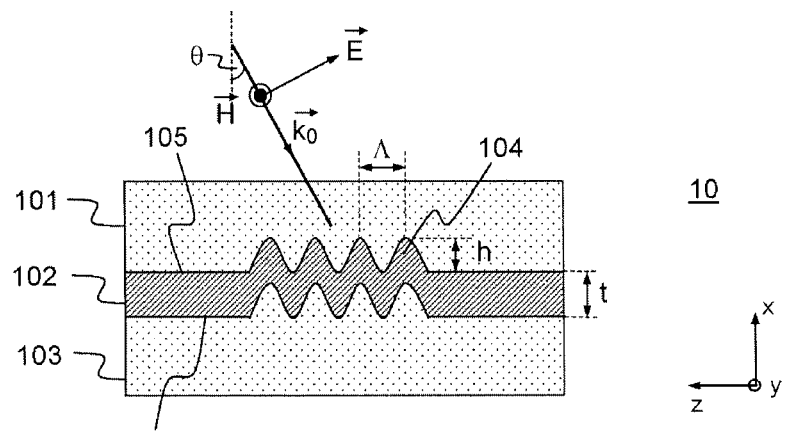
FIGS. 1A and 1B, partial views, respectively of a cross section and from above, of an optical security component according to the invention.
Figure 1B:
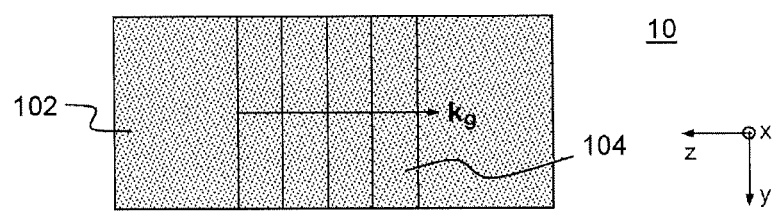

FIGS. 1A and 1B show partial views, a cross-sectional view and a top view respectively, of one embodiment of a security component 10 according to the invention.

The security component according to the invention generally comprises a continuous metal layer 102 of substantially constant (typically between a few tens to 80 nanometers) thickness t, which metal layer 102 is arranged between two transparent dielectric layers 101, 103 in order to form two dielectric/metal interfaces 105, 106. The metal may be any metal capable of supporting plasmonic resonance, and is preferably silver, aluminum, gold, chromium, or copper. The dielectrics may be any dielectric material that can be "non-destructively associated" with the metal, i.e. any dielectric for which there is no risk of a physico-chemical reaction, for example oxidation, occurring that would degrade the effect to be checked. The dielectrics used for the layers 101, 103 have substantially identical, typically about 1.5, refractive indices, the difference between these indices advantageously being less than 0.1. For example, the dielectric layer 101 of refractive index $n_1$ is a polymer layer intended to be embossed, and the layer 103 is a dielectric polymer encapsulating layer of refractive index $n_2$ substantially equal to $n_1$. The layers 101, 103 are transparent in the visible. It is known that, at the interface between a conductive material, for example a metal, and a dielectric, it is possible for a surface electromagnetic wave, associated with a collective oscillation of electrons at the surface, to propagate, this surface electromagnetic wave being called a surface plasmon. This phenomenon is, for example, described in the reference text by H. Raether ("Surface Plasmons", Springer-Verlag, Berlin Heidelberg). An incident light wave may be coupled to a plasmon mode in various ways, especially by structuring the interface to form a coupling grating.

This basic principle is implemented in the security component according to the invention in order to obtain remarkable effects in transmission.

In the security component 10, the metal layer 102 is structured to form at least two separate coupling zones for coupling to an incident light wave. Each coupling zone comprises a set of substantially rectilinear and parallel corrugations, the corrugations of the various zones extending in non-parallel directions. In each coupling zone, the metal layer is continuous and deformed in such a way as to form said corrugations. FIGS. 1A and 1B schematically show a set of corrugations 104 in one of the coupling zones. Each set of corrugations is characterized by its pitch Λ, the amplitude h of the corrugations (height between peak and trough) and the thickness t of the metal layer in the coupling zone. Typically, the pitch of the grating is comprised between 100 nm and 600 nm and advantageously between 200 nm and 500 nm, the height being comprised between 10% and 45% of the pitch of the grating and advantageously between 10% and 30%. The term "corrugation" is understood to mean a continually varying deformation of the metal layer, which layer is continuous over the entire coupling zone. The profile of the corrugations is advantageously sinusoidal or quasi-sinusoidal; the Applicant has demonstrated that a deformation with a sinusoidal profile is acceptable provided its duty cycle is kept between 40% and 60%. The thickness t of the metal layer must be sufficiently small to allow excitation of and coupling to surface plasmon modes at the two metal/dielectric interfaces, thus enabling a resonant transmission effect as will be described in more detail below.

An incident wave of TM polarization (transverse magnetic wave i.e. for which the magnetic field H is perpendicular to the plane of incidence xz, which is the plane of the figure in FIG. 1A) is considered, this wave being incident on the grating with an azimuth of 0° to the grating vector $k_g$, and on the layer 103 with an angle of incidence θ to the y-axis normal to the plane of the grating formed by the corrugations 104. The grating vector $k_g$, shown in FIG. 1B, is a vector in a direction perpendicular to the lines of the grating and of norm defined by $k_g = 2\pi/\Lambda$, where Λ is the pitch of the grating.

In order for there to be coupling, i.e. for energy to be transferred between a wave incident on a dielectric medium of relative permittivity ∈d, and a plasmon mode, the following equality must be satisfied (see H. Raether, ibid):

$$k_{sp} = n_1 k_0 \sin\theta \pm k_g \quad (1),$$

where:
$k_0$ is the wave number defined by $k_0 = 2\pi/\lambda$; and
$k_{sp}$ is defined by $k_{sp} = n_{sp} k_0$, where $n_{sp}$ is the effective index of the plasmon, given by:

$$n_{sp} \sqrt{\in_m \in_d / (\in_m + \in_d)} \quad (2),$$

in the case of a metal layer of infinite thickness, where ∈m and ∈d are the permittivities of the metal and of the dielectric, respectively.

It is thus possible to define a central wavelength $\lambda_0$, in which wavelength coupling will occur at normal incidence (θ=0°). The central wavelength is defined by:

$$\lambda_0 = \Lambda/n_{sp} \quad (3).$$

Thus, the pitch of the grating will be chosen depending on the desired central wavelength.

With the pitch of the grating fixed, the variation in the coupling wavelength λ is expressed at nonzero angle of incidence, and zero azimuth to the grating network, by equation (1), which can be split into two equations:

$$\lambda = (n_{sp} - n_1 \sin\theta) \times \Lambda \quad (4)$$

$$\lambda = (n_{sp} + n_1 \sin\theta) \times \Lambda \quad (5)$$

There are then two wavelengths at which it will be possible for the incident wave to couple to a surface plasmon, corresponding to co-propagating and contra-propagating plasmon modes, respectively.

When the metal layer is of finite thickness and, in addition, its thickness is of the same order of magnitude as the penetration depth of the electromagnetic field of the plasmon mode in the metal (which is about $1/(k_0(n_{sp}^2 + \text{Re}(|\in_m|)^{1/2}))$), the electromagnetic field of the plasmon mode at the upper interface of the metal layer also "sees" the lower interface and must therefore also satisfy the field boundary conditions at this lower interface. It follows that there are then two plasmon modes that can propagate along the metal layer, both of which have field maxima at the upper and lower interfaces of the metal layer: a plasmon mode, called the long-range plasmon mode, the transverse magnetic field H of which is even (the longitudinal electric field, responsible for the longitudinal oscillation of the electrons, therefore being uneven i.e. it passes through zero in the metal layer), and a plasmon mode, called the short-range plasmon mode, the H field of which is uneven, and which is more highly absorbed by the metal. Their effective indices are similar when the thickness of the metal layer is not too small (greater than 15 nm, for example) and these modes are both coupled to in the presence of a grating when the incident wave originates from a weakly coherent (both spatially and temporally) light source, such as an incandescent lamp or natural light from the Sun. Thus, when the coupling conditions are satisfied, the field of the two plasmon modes coupled to (or "excited") also possesses maxima at the lower interface of the metal layer, and may therefore, by virtue of the presence of the grating, radiate into the transmission medium (layer 103), and thus light energy can pass through the continuous metal layer and thus produce a transmission peak, hence the term "resonant transmission".

Figure 2A:
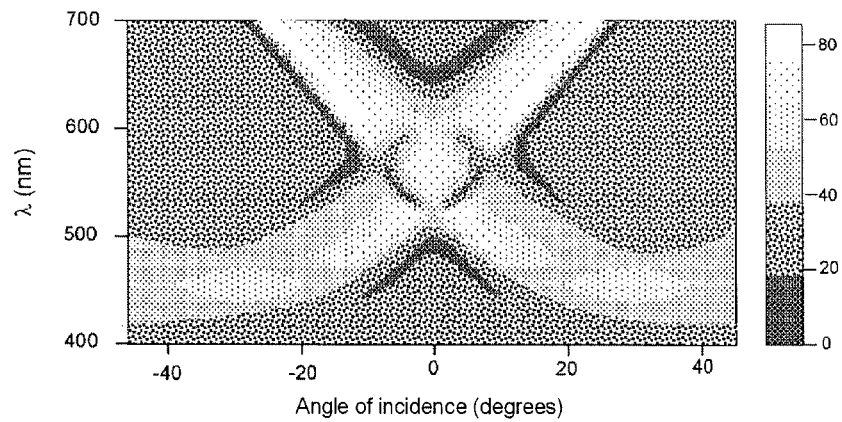
FIGS. 2A and 2B, numerical simulations showing the variation in the intensity of the transmitted wave as a function of wavelength and angle of incidence for a component of the type shown in FIG. 1A, in TM mode and TE mode with an azimuth of 0° and 90°, respectively.

FIG. 2A shows the transmission calculated for a component of the type shown in FIG. 1A, in TM mode, with an azimuth of 0° to the grating vector, as a function of angle of incidence θ and incident wavelength λ. The angle of incidence θ is the angle of incidence on the middle of the layer 103, defined with respect to the normal to the grating. A software program able to simulate electromagnetic wave propagation, such as the software program Gsolver© (developed by Grating Solver Development Company http://www.gsolver.com/), was used for these calculations. The corrugations had a sinusoidal profile with a pitch of 300 nm and a depth of 60 nm. The metal layer was made of silver and had a thickness of 40 nm. It was flanked by two dielectric polystyrene layers. The central wavelength was 560 nm. Transmission at normal incidence ($\theta=0°$) was maximal in a spectral band (typically 50 to 100 nm) centered on this wavelength. As the angle of incidence was increased, a variation was observed in the coupling wavelength i.e. the wavelength at which a resonant transmission effect was observed for the component varied. Axial symmetry was observed about the y-axis about the angle of incidence of 0°. The visual effect obtained will therefore be identical whether the sample is turned in one direction or another.

The same calculation for TE mode (transverse electric wave, i.e. for which the magnetic field E is perpendicular to the plane of incidence xz, which is the plane of the figure in FIG. 1A) showed almost zero transmission through the component.

Various simulations were carried out in which various component parameters were varied in order to measure their influence. In particular, it was possible to show that for maximum coupling, it is preferable to limit the depth of the oscillations (parameter h in FIG. 1A) to between 10% and 20% of the pitch.

Simulations were also carried out with various thicknesses of various types of metal. These calculations generally showed that the coupling spectral band widened when the thickness of the metal layer was decreased, and that the resonant transmission amplitude decreased when the thickness of the metal layer was increased i.e. the coupling spectral band narrowed but its intensity decreased. Thus, it is possible to calculate for the metal layer an optimal thickness that will provide a striking visual effect and a sufficiently wide coupling spectral band. For example, the Applicant has demonstrated that a metal layer made of silver is particularly advantageous when it has a thickness comprised between 35 nm and 50 nm. Other metals were tested. For example, aluminum may also be used to produce a plasmonic component according to the invention. Since aluminum absorbs very strongly in the visible, the metal layer will have to be thinner than a silver layer needs to be, i.e. typically between 16 and 25 nm in thickness. However, the simulation of a structure with a metal layer made of aluminum exhibited, relative to a silver layer, a coupling spectral band that was shifted toward the shortest wavelengths, and a smaller resonant transmission amplitude due to higher Joule losses from the plasmon modes in this metal.

The Applicant has also studied the influence of deformation of the sinusoidal profile of the corrugations on the efficiency of the coupling. It has been observed that modifying the profile from a sinusoidal variation to a corrugation profile having an unbalanced duty cycle causes a rapid drop in the transmitted signal. Advantageously, the duty cycle will be comprised between 40% and 60%.

Figure 2B:
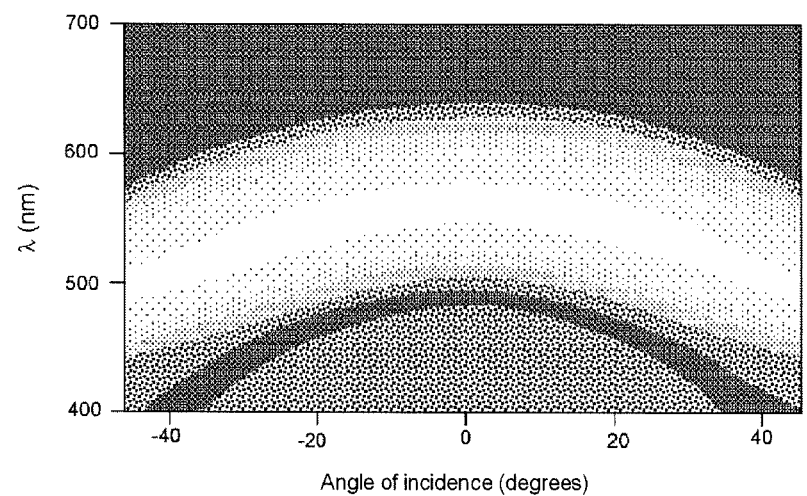

FIG. 2B shows a simulation of the transmission through the component 10 under identical conditions to the conditions simulated for FIG. 2A, but in which the sample has undergone a rotation of 90° in azimuth about the x-axis, the TE polarization being selected. Resonant transmission was again observed at normal incidence at the central wavelength $\lambda_0$. In contrast, it may be seen from this plot that the coupling wavelength is stable as a function of angle of incidence. In other words, the component is insensitive in this configuration to rotation of the sample about the y-axis now parallel to the grating vector.

Figure 3A:
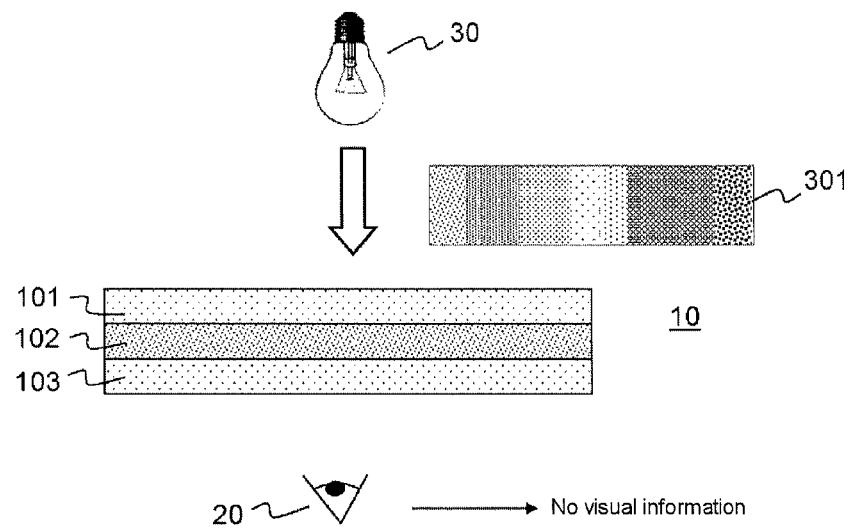
FIGS. 3A to 3D, figures illustrating the effect obtained by observation of the component in transmission, in various configurations.
Figure 3B:
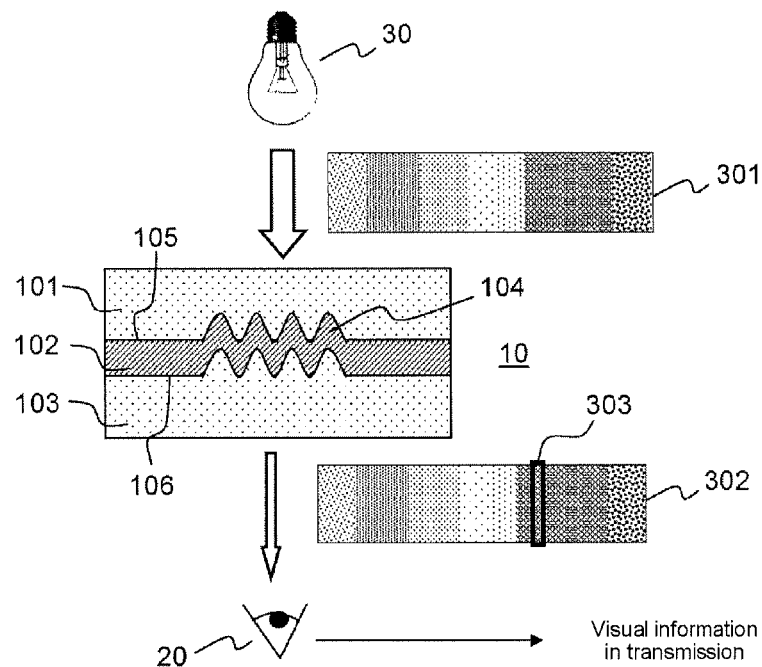
Figure 3C:
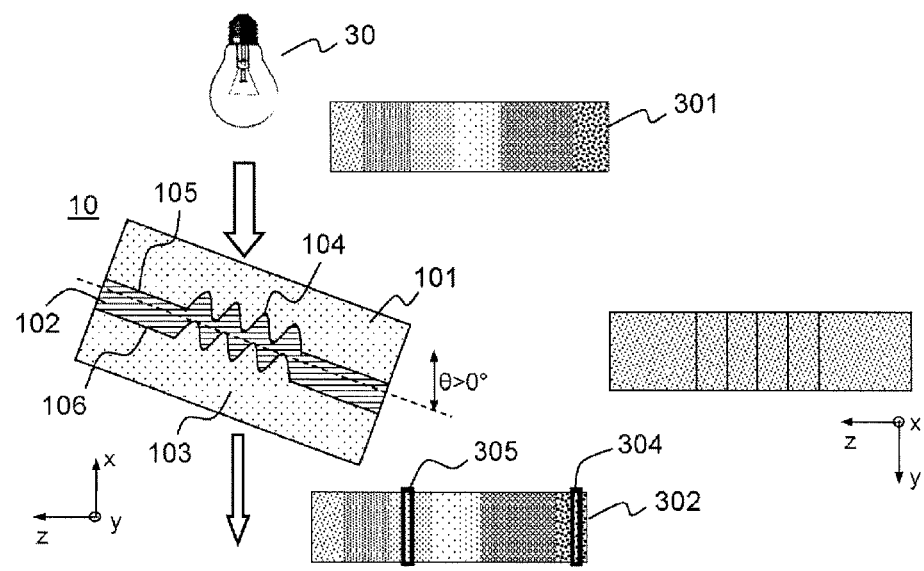
Figure 3D:
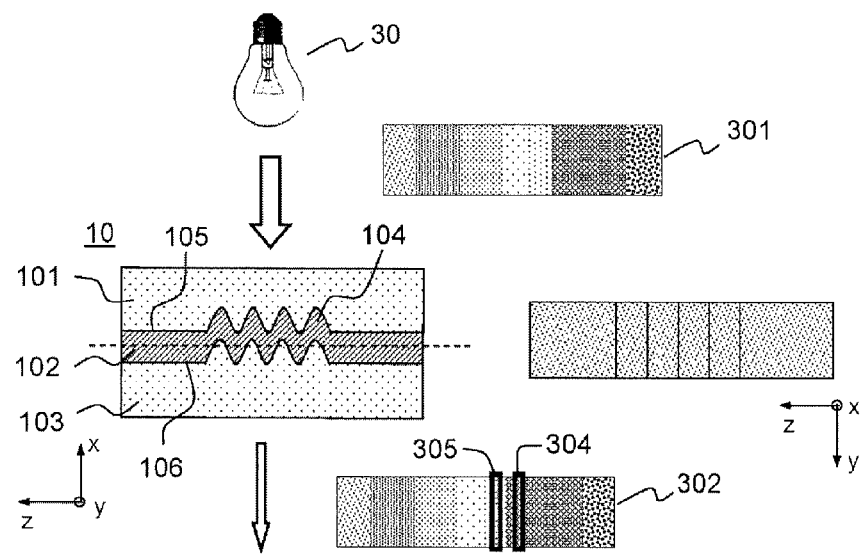

FIGS. 3B to 3D illustrate, by way of 3 observation configurations for a security component 10 of the type shown in FIG. 1, the effect of azimuth □ and angle of incidence, or tilt, θ on the visual impression experienced by an observer. FIG. 3A illustrates, by way of comparison, observation of a security component the metal layer of which is not structured.

In FIG. 3A, the component 10, comprising an unstructured metal layer 102 arranged between two dielectric layers 101, 103, is illuminated by a light source 30, for example a white light source the spectrum of which is schematically shown by an array of colors symbolized by various dotted regions in the chart 301. This may be, for example, a spectrum comprising every color in the visible. If an observer 20 observes the light transmitted through this component, they receive no visual information. Specifically, there is no coupling with a plasmon wave and the metal layer behaves like a reflector. The incident light flux is not transmitted by the component.

In the configurations in FIGS. 3B to 3D, a security component 10 with a structured metal layer 102 forming a corrugated coupling zone 104, such as was described above with reference to FIGS. 1A and 1B, is considered.

In the example in FIG. 3B, the observation is carried out at an azimuth of 0° and at normal incidence. The corrugations 104 form a grating for coupling the incident wave with surface plasmons supported by the metal/dielectric interfaces 105 and 106, which grating is optimized at normal incidence for a wavelength given by the equation (3). At this wavelength, the TM component of the incident electromagnetic wave is transmitted by the structure remarkably well, and an observer 20 observes colored visual information corresponding to a thin spectral band about this wavelength. In the spectrum schematically showing by the chart 302 in FIG. 3B, only the light component 303 corresponding to the spectral band may be seen by the observer.

If an observer continues to observe this same component at an azimuth of 0° but varies the angle of incidence, they observe a substantial variation in color, as is shown in FIG. 3C. Specifically, as was explained above, a nonzero angle of incidence (or tilt) θ of the y-axis perpendicular to the grating vector causes a large variation in the coupling wavelength, both to longer and shorter wavelengths than the coupling wavelength at normal incidence. By tilting the component, the observer therefore sees the color vary greatly with the angle of tilt. In the example in FIG. 3C, the references 304, 305 in the spectrum 302 show the spectral bands seen by the observer.

In the example in FIG. 3D, the observed component is rotated, not about the y-axis, perpendicular to the grating vector, but about the z-axis, parallel to the grating vector. In this case, a small variation in the wavelength is observed, illustrated by the spectral bands 304, 305 in the transmitted spectrum. Indeed, this configuration is equivalent to the configuration illustrated in FIG. 2B in which the component is turned about an axis parallel to the grating vector.

Thus it would appear that, depending on the azimuth and tilt, the behavior of the transmissive grating will be completely modified, and it is in particular this effect that the Applicant has employed to produce a security component that is controllable in transmission.

Lastly, it is worth noting that the component thus produced may be observed by an observer from either side, i.e. in the example in FIGS. 3B to 3D, with either the layer 101 or the layer 103 oriented toward the light source 30, with the same effect. Specifically, the dielectric/metal/dielectric structure, comprising dielectric materials of similar or comparable refractive indices, is symmetric, and the extra layers which could be added on either side, with a view to use of the component, are neutral, as will be described below.

Figure 4:
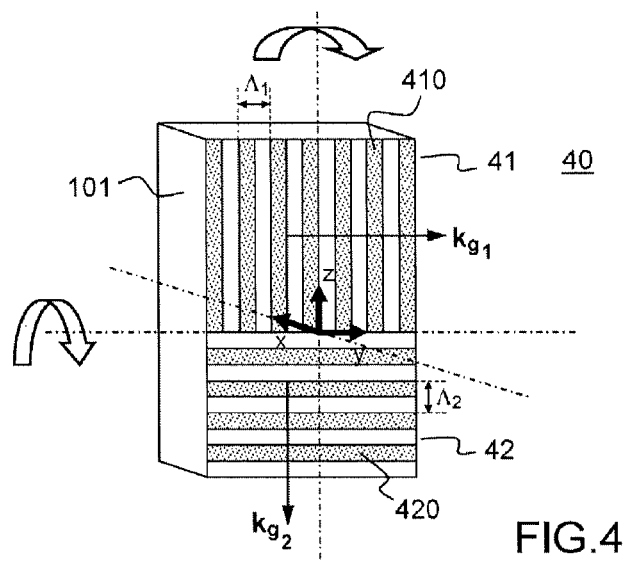
FIG. 4, an embodiment of a component having two structured zones with two orthogonal grating vectors.
Figure 5A:
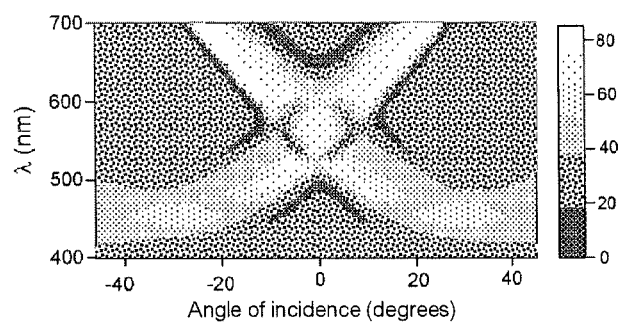
FIGS. 5A and 5B, numerical simulations showing the variation in the intensity of the transmitted wave as a function of wavelength and tilt in the two zones of the component shown in FIG. 4.
Figure 5B:
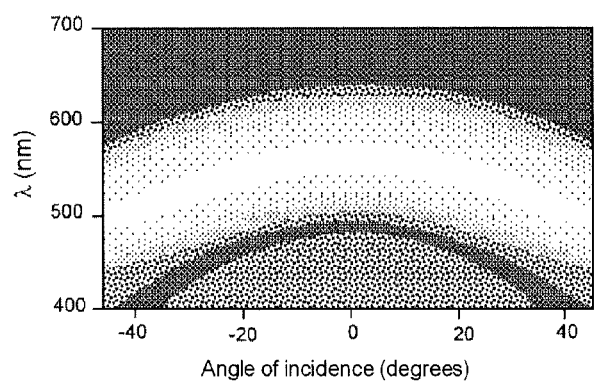

FIG. 4 shows an optical security component 40 according to one embodiment of the invention. It is a cross section through the metal layer, only one of the layers of dielectric being shown. FIGS. 5A, 5B on the one hand, and 6A, 6B on the other hand, are figures or curves showing the transmission calculated for the component in FIG. 4 depending on various parameters.

The component 40 comprises two coupling zones 41, 42, each comprising a set of corrugations 410, 420 symbolized by dotted strips in FIG. 4. In this example, the corrugations of each coupling zone are oriented in a main direction, defining, for each coupling zone, a grating vector, $k_{g1}$ and $k_{g2}$, respectively, pointing in a direction perpendicular to the main direction of the corrugations, and of norm given by $k_{g_i} = 2\pi/\Lambda_i$ where $\Lambda_i$ is the pitch of the corrugations in each of the zones. In this example, the grating vectors of the coupling zones are substantially orthogonal. In the orthonormal coordinate system x, y, z in FIG. 4, the corrugations 410 of the coupling zone 41 are thus oriented along the z-axis (grating vector pointing along the y-axis), and the corrugations 420 in the coupling zone 42 are oriented along the y-axis (grating vector pointing along the z-axis), the x-axis being the axis perpendicular to the surface of the component, which is also the plane of the figure. In this example, the sets of corrugations 410, 420 have substantially identical characteristics (their pitch and the nature of the metal in particular) such that the central wavelength is substantially identical for both coupling zones. Alternatively, one of the parameters could be modified, for example the pitch of the corrugations, or the nature of the metal and the thickness of the layer, in such a way as to modify the central wavelength, and therefore the "color" at normal incidence, observed by an observer.

FIGS. 5A and 5B illustrate the transmission calculated for the coupling zones 41 and 42, respectively, as a function of angle of incidence measured about the z-axis, and of wavelength, when an observer observes the component 40 with an azimuth of 0° under white light. For these calculations, the same electromagnetic wave propagation simulating software package that was used above was used, and the conditions were identical to those used for the simulations presented in FIGS. 2A and 2B.

In the coupling zone 41 of the component, the angle of incidence was varied about an axis perpendicular to the grating vector. A very large variation in the coupling wavelength was then observed as a function of angle of incidence (FIG. 5A). The simulation was carried out for the TM mode, the contribution of which was demonstrated by the Applicant to be largely dominant over the contribution of the TE mode, and which therefore represented what an observer would see under unpolarized light. The applicant demonstrated that an angular variation of 1° shifted the TM polarization by 7 nm, whereas the TE mode was shifted by almost zero. Thus, at normal incidence, an observer will see a green color in transmission corresponding to a spectral band centered on about 560 nm. By turning the component about the z-axis, the zone 41 will very quickly be seen to take on a mainly red and slightly blue tint corresponding to the two coupling wavelengths associated with the co-propagating and contra-propagating modes. In the coupling zone 42, rotation of the component about the z-axis corresponds to a rotation about an axis parallel to the grating vector. FIG. 5B shows the variation in transmission as a function of angle of incidence and wavelength, calculated for TE mode, the contribution of which, in this configuration, is largely dominant over the TM mode. The color variation observed in FIG. 5B is much smaller, and the zone 42 will remain a green tint.

Figure 6A:
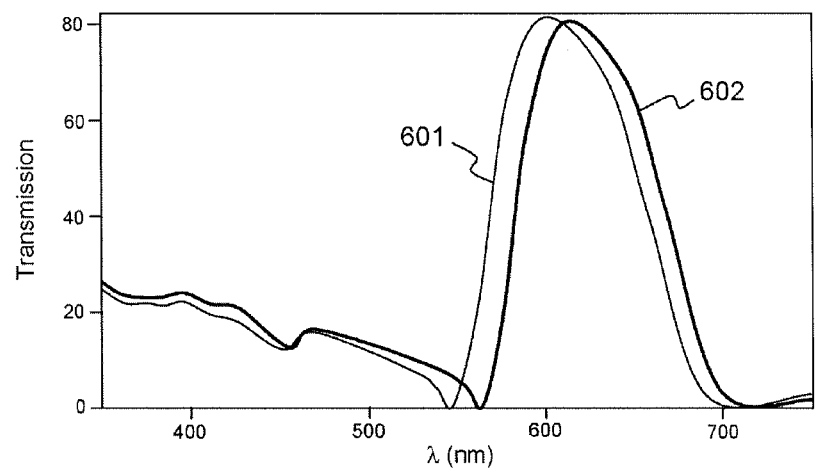
FIGS. 6A and 6B, transmission curves for a component of the type illustrated in FIG. 4 as a function of wavelength for two angles of incidence.
Figure 6B:
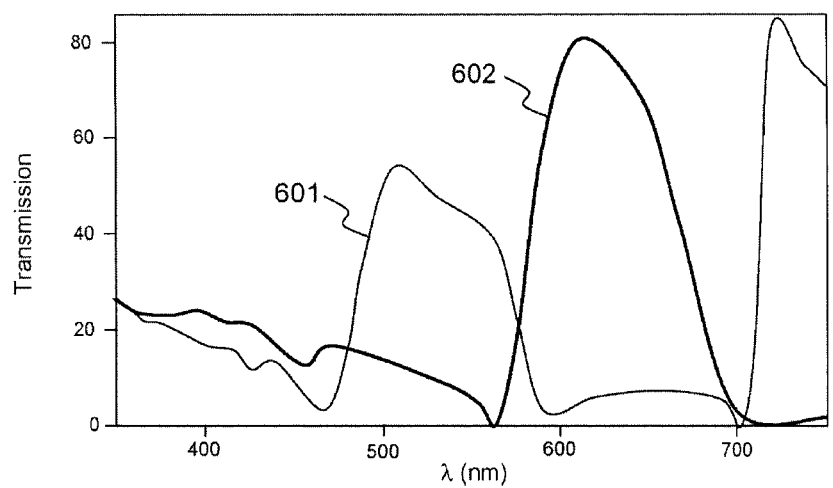

FIGS. 6A and 6B thus show, for an angle of incidence, to the z-axis (FIG. 4), of 0° (curve 602) and 15° (curve 601) respectively, the transmission as a function of wavelength in zones 42 (FIG. 6A) and 41 (FIG. 6B) respectively, calculated with the same parameters as above. These curves confirm the small variation in the transmission as a function of wavelength observed in the zone 42 relative to the very large variation in wavelength observed in the zone 41. Thus, the central wavelength of the transmitted spectral band passes from 615 nm at normal incidence, to 601 nm for an angle of 15° in the zone 42, whereas it passes from 615 nm at normal incidence, to 508 nm for an angle of 15° in the zone 41.

The same observer, if they turned the component about the y-axis (FIG. 4) would in contrast see a very large variation in the color of the coupling zone 42, of the type shown in FIG. 5A, calculated for TM mode, and a very small variation in the color of the coupling zone 41, as is illustrated in FIG. 5B, calculated for TE mode.

Thus, by varying the angle of incidence of the component about one or other of the axes, it will be possible for an observer to see the color of one of the zones vary very rapidly whereas the color of the other zone will remain fairly stable.

Advantageously, the orthogonality of the coupling gratings formed by the sets of corrugations 410 and 420 is respected to within ±5°. This is because the Applicant has demonstrated that in this range of variation in the angle between the two sets of corrugations, a very good color stability will continue to be perceived in the coupling zone the grating vector of which is parallel to the axis of rotation of the component, and the variation in the coupling wavelength will be equally as effective in the coupling zone the grating vector of which is perpendicular to the axis of rotation of the component. If the orthogonality of the two sets of corrugations differs by more than the threshold of about ±5°, the effect will be less and less visible, because the contrast between the coupling zone in which the color is stable and the coupling zone in which the color rapidly varies will be smaller.

Advantageously, the zones 41, 42 in FIG. 4 could be given complementary shapes and characteristics, as is illustrated, for example, in FIGS. 7A to 7D. FIG. 7A is a cross-sectional view of an example security component 70, through the metal layer 102. FIGS. 7B to 7D illustrate the component 70 as seen in transmission in various configurations.

As may be seen in FIG. 7A, one coupling zone 72, comprising a set of rectilinear and parallel corrugations forming a coupling grating of grating vector $k_{g2}$, has a heart shape. The coupling zone 71 comprises substantially rectilinear and parallel corrugations arranged in a direction perpendicular to that of the corrugations of the coupling zone 72 in order to form a coupling grating of grating vector $k_{g1}$, and its shape is complementary to that of the coupling zone 71. Thus, in this example, the coupling zone 71 has a substantially rectangular shape, its corrugations being interrupted in a central zone corresponding to the coupling zone 72. Moreover, the security component shown in FIG. 7A comprises a zone 73 that forms a frame about the coupling zone 71, and in which the metal layer is not structured.

If an observer observes the security component 70 in transmission at normal incidence, they will see an image of the type shown in FIG. 7B, i.e. having a uniform color over the entire component (if the parameters of the sets of corrugations are substantially identical) except in the unstructured zone 73, which for its part has a constant optical density that is clearly higher than those of the structured zones 71, 72. The color will be that corresponding to a spectral band centered on the wavelength at which the grating formed by the corrugations is optimized, for example a green color at about 550 nm, as in the preceding example.

If the observer rotates the component 70 about an axis perpendicular to the grating vector $k_{g1}$ (FIG. 7C), they will observe a rapid variation in the color of the coupling zone 71, whereas the color of the heart-shaped coupling zone 72 will remain stable. If in contrast, the observer rotates the component 70 about an axis perpendicular to the grating vector $k_{g2}$ (FIG. 7D), they will observe a rapid variation in the color of the heart-shaped coupling zone 72, whereas the color of the coupling zone 71 will remain stable. Thus, rotation of the component about one axis induces a rapid variation in the color of one of the zones, which corresponds in this example to a pattern of characteristic shape, whereas rotation about the perpendicular axis induces a rapid variation in the complementary zone.

An observer will easily be able to verify the authenticity of a document of value secured by virtue of the various levels of security provided by such a component. It will be sufficient for them to observe the component in transmission under unpolarized white light. By varying the angle of observation of the component in tilt about one of the axes of the pattern, they will observe a rapid variation in the color of one zone. This variation will be all the more characteristic because, in a complementary zone, the color varies very little. Moreover, the presence of an unstructured, and therefore opaque, reference zone (zone 73 in the example in FIG. 7) highlights the transparency of the coupling zones. For a second level of verification, it will be possible to vary the angle of incidence of the component about an axis perpendicular to the first axis. The observer will then observe a rapid variation in the color of the zone that is complementary to the first.

FIGS. 8 and 9 illustrate two variants of a security component according to the invention, their coupling zones having grating vectors that are perpendicular pairwise.

Figure 8A:
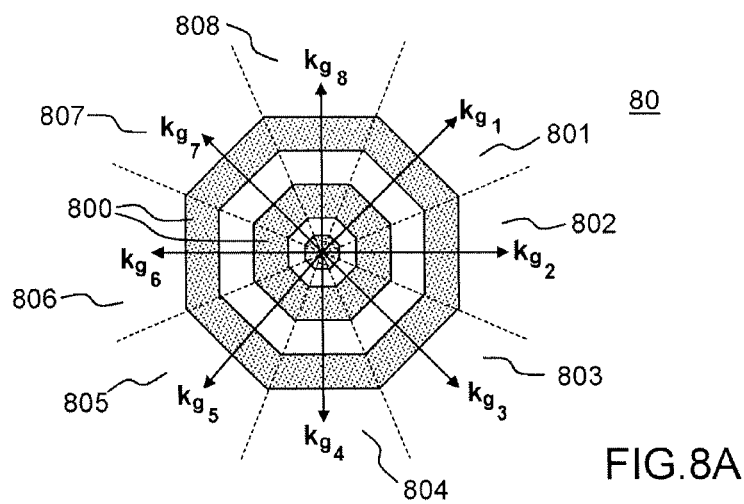
FIGS. 8A to 8C, two other example security components according to the invention.
Figure 8B:
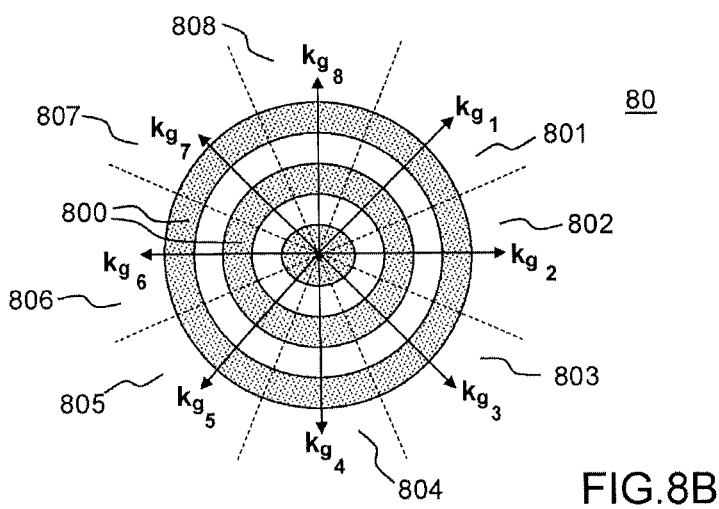
Figure 8C:
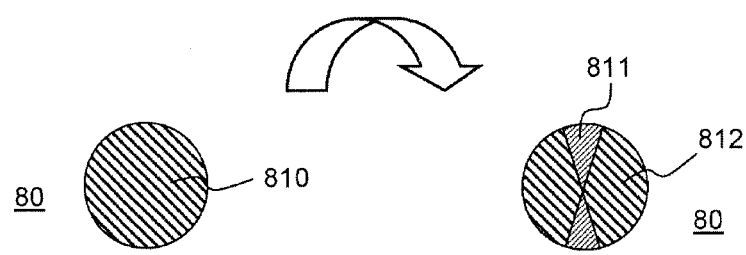

FIGS. 8A and 8B illustrate security components comprising corrugations 800 arranged concentrically. The corrugations 800 may be polygonal (FIG. 8A) or circular (FIG. 8B) in shape. A plurality of coupling zones, referenced 801 to 808, may be defined, each of which contains corrugation portions that are substantially rectilinear and parallel, forming coupling gratings defined by grating vectors $k_{g1}$ to $k_{g8}$.

If an observer observes a security component 80 of the type thus described in transmission at normal incidence, they will see a dot 810 of a uniform color (FIG. 8C) defined by the spectral band about the wavelength at which the coupling gratings are optimized. This color therefore depends on the pitch and the depth of the corrugations 800, and on the thickness of the metal layer. If an observer tilts the component, i.e. makes the angle of incidence vary, coupling zones 811 having grating vectors perpendicular to the rotation axis of the component (coupling zones symmetric about the center of symmetry of the component) will see their colors vary very rapidly, whereas the color of the rest of the dot (812, FIG. 8C) will remain stable.

Because of the axial symmetry of the component about the x-axis in FIG. 1A, it will be possible, whatever the azimuthal orientation of the component, to observe a variation in color in two symmetrical zones of the component by rotating the latter about an axis contained in the plane of the component (tilt). Moreover, for a given azimuth, by varying the axis of rotation of the component, the color in other zones of the component, corresponding to two symmetric zones for which the grating vector is substantially perpendicular to the axis of rotation, will be observed to vary, again making the security component very easy to authenticate.

Figure 9A:
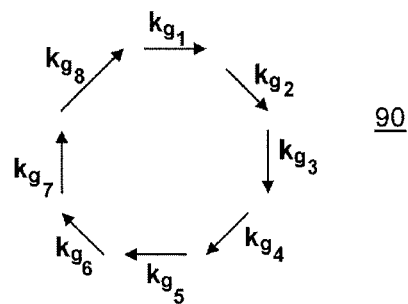
FIGS. 9A and 9B, another example security component according to the invention.

FIG. 9A schematically shows a security component 90 that is also axially symmetric, which component 90 has corrugations arranged radially (not shown in FIG. 9A) such that coupling zones containing substantially rectilinear and linear corrugations could be defined locally, the corrugations in each zone defining a grating vector $k_{gi}$ pointing in a direction perpendicular to the main direction of the corrugations in the zone.

Figure 9B:
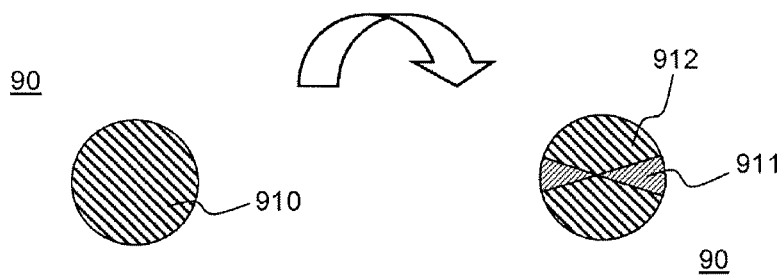

Here again, as illustrated in FIG. 9B, an observer observing the sample in transmission at normal incidence will see a substantially uniform color corresponding to the coupling wavelength defined by the pitch and the depth of the corrugations. By tilting the component, they will observe a rapid variation in the color in symmetric zones the grating vectors of which are perpendicular to the rotation axis of the component. As was the case for the component described in FIG. 8, the effect will be insensitive to the azimuthal position of the component due to its axial symmetry, and a rotation about a different axis will lead to a variation in the color in another zone of the component.

Security components such as described above may be produced in the following way. The optical structures (corrugations) of the various zones are written, by photolithography or e-beam lithography, into a photoresist. An electroplating step allows these optical structures to be transferred to a resistant material, for example a nickel-based material, in order to produce a "master". The master is then used in a stamping step in order to transfer the microstructure to a film and to structure the dielectric layer 101 (FIG. 1A), typically an embossing lacquer a few microns in thickness borne by a polymer film that is 12 µm to 50 µm in thickness, for example a polyethylene terephthalate (PET) film. The stamping may be carried out by hot embossing or casting the dielectric. The refractive index of the layer formed of the embossing lacquer is typically 1.5. Next, the layer thus stamped is metallized. The metallization is carried out under vacuum in a way that allows its thickness to be perfectly controlled, and with one, for example, of the following metals: silver, aluminum, gold, chromium, copper, etc. A sealing layer of controlled refractive index is then applied, for example using a coating process. For certain applications, such as products for lamination or hot-marking, this layer may be the adhesive layer. The sealing layer, which forms the layer 103 (FIG. 1A) has a refractive index substantially the same as that of the embossed layer, about 1.5, and the thickness larger than several microns. Depending on the intended final application of the product, an adhesive may be applied to the sealing layer.

As a variant, it is possible for a number of different metals to be applied in the metallization step, for example in order to produce different visual effects. To do this, it is for example possible to apply, with a given pattern, a soluble ink to the embossed layer. During the metallization with the first metal, the latter is applied uniformly over the layer but, once the ink has been removed, remains in place only in zones that were free from ink. Next, a selective second metallization is carried out, also comprising a selective prior step of printing with a soluble ink, allowing the zones where the second metal will be applied to be selected. It is possible, during the application of the second metal, for the metal layers to be superposed locally, forming zones of higher optical density, or in contrast for non-metallized zones to result, which zones, once covered by the sealing layer, will form transparent zones in the component.

As a variant, the different metal zones may correspond to different coupling zones. In other words, the first metal is applied to one or more first coupling zones, whereas the second metal is applied to one or more second coupling zones, allowing distinct color effects to be obtained in the various coupling zones. Alternatively, the various metals may be deposited in zones that do not correspond to coupling zones.

Advantageously, the most opaque zones, which require at least 2 metallizations, or in contrast the most transparent zones, which may from the first partial metallization onward, will possibly be used to form graphical elements separating the zones formed of the various metals. These elements will be used by those skilled in the art to reinforce the impact of the design in order to make it easier for the person responsible for checking to read it.

Figure 10:
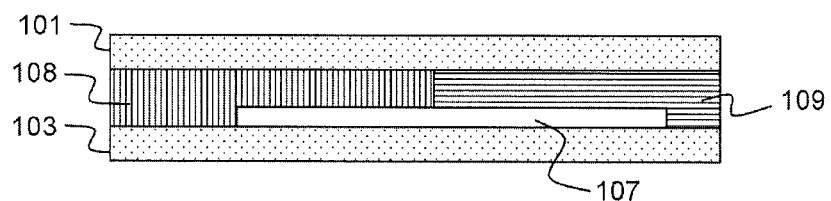
FIG. 10, a figure illustrating a cross-sectional view of a variant of a security component according to the invention.

FIG. 10 schematically shows a (partial) cross-sectional view of the component thus obtained. Only the functional layers required to obtain the plasmonic effect are shown in this figure. Optional supporting or adhesive films are not shown. The two metal layers 108, 109 are located between the dielectric layers 101 and 103. The zone 107 represents the zone where the layer 103 is embossed and the metal layers structured, i.e. the zone in which the corrugations (not shown) are found. As a variant, the various metals will possibly correspond to various coupling zones. Due to the different nature of the metals used, the different zones of such a component will possibly exhibit different color effects, both when the reflected color of the material is observed and when plasmonic waves are observed in transmission. Specifically, the "plasmonic" color of a grating results from the grating and the nature of the metal layer. Moreover, as it is more complicated to produce, such a product potentially has a much higher resistance to counterfeiting.

As will have been apparent from the example manufacturing method described above, inclusion of an optical security component according to the invention in a secure document is perfectly compatible with the presence in the same document of the grating-based structures conventionally used to produce holographic components.

In particular, it will be possible to produce an optical security element comprising one or more plasmonic components of the type described above and one or more other types of optical security components, holograms for example.

To do this, a master will possibly be produced by writing the various patterns, corresponding to the various optical security components, into the photoresist and then electroplating said patterns. Next, the stamping step may be carried out using the master to transfer the various microstructures into the polymer film intended to be embossed. The metallization the thickness of which must be controlled for the plasmonic-effect components may be carried out over the entire film, because it will not adversely affect the other DOVID components, which function in reflection.

Figure 11A:
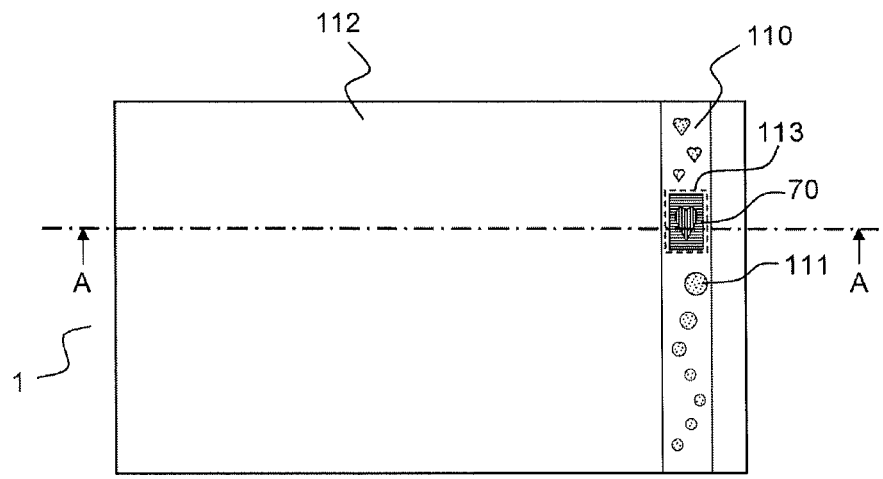
FIGS. 11A to 11C, views, from above, below and in cross section, respectively, of an example secure document comprising a security component according to the invention.
Figure 11B:
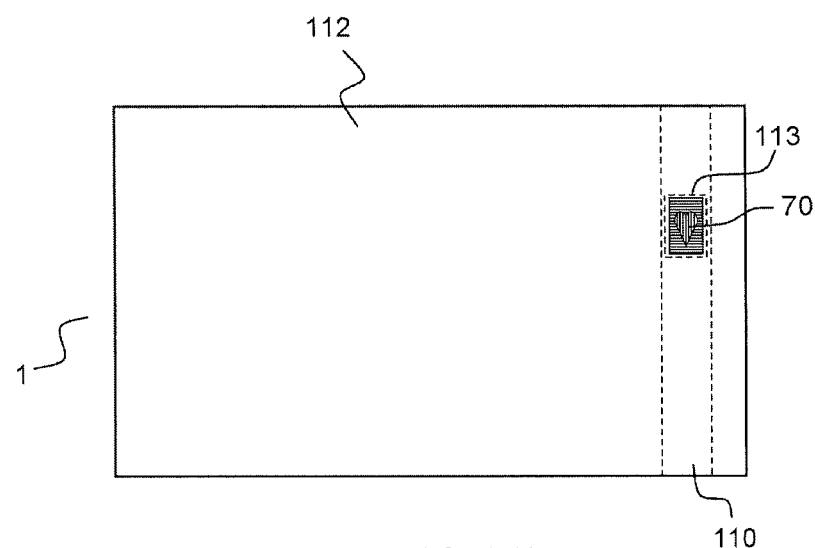
Figure 11C:
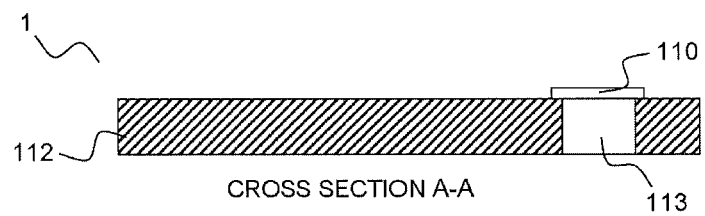

FIGS. 11A to 11C show a secure document 1, for example a document of value of the banknote type, thus equipped with a security element 110 comprising a plasmonic optical security component 70 and other optical security components 111, holographic components for example. FIG. 11A shows a top view of this component, FIG. 11B shows a bottom view and FIG. 11C a cross-sectional view.

The security element 110 takes the form of a strip, typically 15 mm in width, which is fastened to a support 112 of the document 1. The security element 110 is fastened to the support 112 by known means. For example, in the case of a document containing a transparent solid zone, the security element may be fastened by hot transfer with activation of a transparent adhesive layer applied beforehand to the sealing layer 101. In this case, a detachment layer (for example a wax layer) may be applied between the embossing lacquer 103 and the supporting PET film (not shown in FIG. 1A or FIG. 10). The security element is transferred to the document by pressing the hot security element against the document, the plasmonic component being located facing the transparent zone. During the transfer, the adhesive film bonds to the support 112 of the document and the detachment layer and the supporting film are removed. A transparent window 113 is provided in the support 112 level with the plasmonic component 70. Seen from above, all the optical security components will be visible on the secure document 1 and it will be possible to check them all using various prior-out methods. Seen from below, only the one or more plasmonic components will be visible; it will be possible to check them in transmission, as was described above.

Figure 12A:
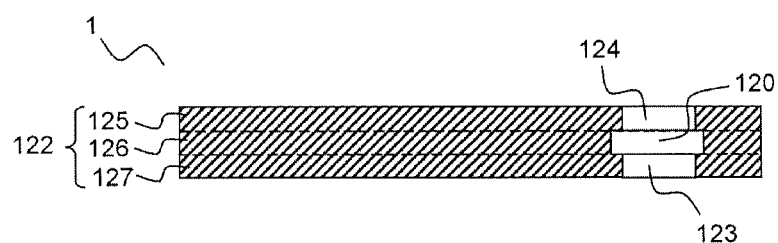
FIGS. 12A and 12B, cross-sectional views of two variants of an example secure document comprising an optical security component according to the invention.
Figure 12B:
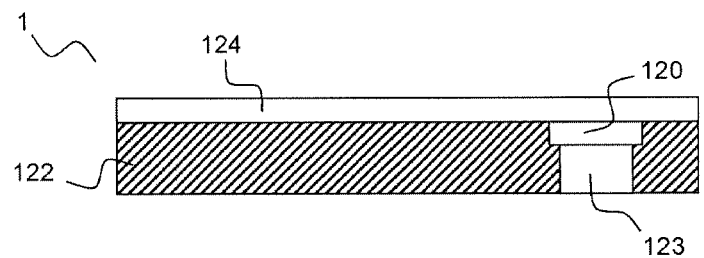

FIGS. 12A and 12B illustrate cross-sectional views of two variants of an embodiment of a secure document 1 equipped with a security element comprising an optical security component 120. In these two examples, the optical security component, or the optical security element bearing the optical security component, is encapsulated in the support 122 of the secure document. In the example in FIG. 12A, the secure document 1 is for example obtained by laminating a number of layers 125, 126, 127, the optical security component being integrated into the middle layer 126, whereas transparent zones 123, 124 are provided in the external layers 123, 124 in order to ensure the optical security component 120 can be seen. As a variant, the layers 125, 126, 127 may be combined in order to form a uniform support 122 in which the optical security component is encapsulated. In the example in FIG. 12B, the optical security component is fixed to a first layer 122 forming a support, the assembly being with covered with a layer 124 made of a transparent material. A transparent window 123 is provided in the supporting layer 122 in order to allow the optical security component 120 to be observed in transmission. This transparent window may be a gap or a locally transparent material. The document 1 thus produced is for example a security document such as an identity card or a banknote equipped with a security thread.

The secure document thus obtained can be very easily checked by an inexperienced user, and the authentification obtained is highly reliable. As has been shown, the plasmonic optical security component according to the invention will possibly take the form of a security film the characteristics of which may be checked by eye in the visible. Visual authentication of the secure document is therefore possible, including under natural light. This authentication, based on visual effects that differ in transmission depending on the rotation axis of the component, is particularly easy to carry out.

In practice, an observer will possibly check the secure document by observing the plasmonic component in transmission in front of a white light source. Alternatively, it will be possible to check the security component by placing it in a light-emitting support.

Although described by way of a certain number of embodiments, the optical security component according to the invention and the method for manufacturing said component comprise various variants, modifications and improvements that will appear obvious to those skilled in the art, it being understood that these various variants, modifications and improvements form part of the scope of the invention such as defined by the following claims.

The invention claimed is:

1. A plasmonic optical security component intended to be observed in transmission, comprising:
   two transparent dielectric layers; and
   a metal layer arranged between said transparent dielectric layers in order to form two dielectric/metal interfaces, characterized in that the metal layer is structured to form corrugations on at least one part of the surface of the metal layer, the corrugations being able to couple surface plasmon modes supported by said dielectric/metal interfaces with an incident light wave,
   the corrugations being arranged in a first main direction in a first coupling zone, and in a second main direction, substantially perpendicular to said first main direction, in at least one second coupling zone distinct from the first coupling zone, said metal layer being continuous in each of said coupling zones,
   wherein the first coupling zone and the at least second coupling zone exhibit a visual contrast when the component is observed in transmission with the naked eye.

2. The optical security component as claimed in claim 1, wherein two of said coupling zones form complementary patterns.

3. The optical security component as claimed in claim 1, wherein at least one part of the corrugations are arranged concentrically.

4. The optical security component as claimed in claim 1, wherein at least one part of the corrugations are arranged radially.

5. The optical security component as claimed in claim 1, wherein said metal layer furthermore comprises an unstructured zone.

6. The optical security component as claimed in claim 1, wherein said corrugations have a pitch comprised between 100 nm and 600 nm and a depth comprised between 10% and 30% of the pitch.

7. The optical security component as claimed in claim 1, wherein the difference between the refractive indices of said transparent dielectrics forming each of said layers is less than 0.1.

8. The optical security component as claimed in claim 1, wherein at least one part of the metal layer is formed of silver and its thickness is substantially comprised between 20 and 60 nm.

9. The optical security component as claimed in claim 1, wherein at least one part of the metal layer is formed of aluminum and its thickness is substantially comprised between 10 and 30 nm.

10. The optical security component as claimed in claim 1, wherein the metal layer is formed of a single metal.

11. The optical security component as claimed in claim 1, wherein the metal layer comprises at least two parts each of which is formed of a different metal.

12. An optical security element intended to secure a document and comprising at least one optical security component as claimed in claim 1.

13. The optical security element as claimed in claim 12, further comprising a supporting film bearing one of said transparent dielectric layers.

14. The optical security element as claimed in claim 12, further comprising an adhesive film placed on one of said transparent dielectric layers.

15. A secure document comprising a support and an optical security component as claimed in claim 1, fixed to said support, said support comprising a transparent zone on which said optical security component is arranged.

16. A secure document comprising a support and an optical security component as claimed in claim 1, encapsulated in said support, said support comprising transparent zones on either side of said optical security component.

17. A method for manufacturing a plasmonic optical security component, comprising:
   depositing a metal layer on a first transparent dielectric layer; and
   encapsulating said metal layer with a second dielectric layer, in order to form dielectric/metal interfaces,
   the method being characterized in that the metal layer is structured to form corrugations on at least one part of the surface of the metal layer, the corrugations being able to couple surface plasmon modes supported by said dielectric/metal interfaces with an incident light wave, the corrugations being arranged in a first main direction in a first coupling zone, and in a second main direction, substantially perpendicular to said first main direction, in at least one second coupling zone distinct from the first coupling zone, said metal layer being continuous in each of said coupling zones, wherein the first coupling zone and the at least second coupling zone are configured to exhibit a visual contrast when the component is observed in transmission with the naked eye.

18. The method as claimed in claim 17, in which said first dielectric layer is structured to form said corrugations, and the metal layer is deposited, with a substantially constant thickness, on said thus structured first layer.

19. The method as claimed in claim 18, in which the deposition of the metal layer comprises depositing a first layer comprising a first metal on a first part of the surface of said first dielectric layer and depositing at least one second layer comprising a second metal on a second part of the surface of said first dielectric layer.

20. The method as claimed in claim 17, wherein the deposition of the metal layer is carried out selectively, allowing macroscopic patterns that are visible to the naked eye in transparency to be defined.

* * * * *